US011697947B2

(12) United States Patent
Kritzer

(10) Patent No.: US 11,697,947 B2
(45) Date of Patent: Jul. 11, 2023

(54) THREE-LEVEL VEHICLE LIFT

(71) Applicant: BendPak, Inc., Santa Paula, CA (US)

(72) Inventor: Jeffrey S. Kritzer, Moorpark, CA (US)

(73) Assignee: BendPak, Inc., Santa Paula, CA (US)

( * ) Notice: Subject to any disclaimer, the term of this patent is extended or adjusted under 35 U.S.C. 154(b) by 798 days.

(21) Appl. No.: 16/746,441

(22) Filed: Jan. 17, 2020

(65) Prior Publication Data

US 2020/0232238 A1    Jul. 23, 2020

Related U.S. Application Data

(60) Provisional application No. 62/795,353, filed on Jan. 22, 2019.

(51) Int. Cl.
| | | |
|---|---|---|
| *E04H 6/18* | (2006.01) | |
| *B66F 7/04* | (2006.01) | |
| *B66F 7/28* | (2006.01) | |
| *H02G 3/04* | (2006.01) | |

(52) U.S. Cl.
CPC .............. *E04H 6/188* (2013.01); *B66F 7/04* (2013.01); *B66F 7/28* (2013.01); *H02G 3/045* (2013.01); *H02G 3/0418* (2013.01); *B66F 2700/02* (2013.01); *B66F 2700/123* (2013.01)

(58) Field of Classification Search
CPC .......... E04H 6/12; E04H 16/26; H02G 3/045; H02G 3/0418; B66F 7/04; B66F 7/06; B66F 7/08; B66F 7/16; B66F 7/20; B66F 7/28
See application file for complete search history.

(56) References Cited

U.S. PATENT DOCUMENTS

| | | | | |
|---|---|---|---|---|
| 2,765,932 | A | | 10/1956 | Nielsen |
| 2,915,143 | A | | 12/1959 | Simmons, Sr. |
| 3,802,579 | A | | 4/1974 | Genest et al. |
| 4,674,938 | A | * | 6/1987 | Van Stokes ............... B66F 7/04 187/253 |
| 5,035,562 | A | * | 7/1991 | Rosen ...................... E04H 6/06 187/203 |

(Continued)

FOREIGN PATENT DOCUMENTS

| | | |
|---|---|---|
| CH | 647034 A5 | 12/1984 |
| CN | 201276856 Y | 7/2009 |

(Continued)

OTHER PUBLICATIONS

BendPak Brochure on 14,000-lb. Capacity / 3-Level Parking Lift / Multiple Heights /Special Order, Copyright 2018.

(Continued)

*Primary Examiner* — Seahee Hong
(74) *Attorney, Agent, or Firm* — Avek IP, LLC; Kent R. Erickson

(57) ABSTRACT

A three-level vehicle lift. The lift includes a four-post configuration in which each post includes a pair of vertically extending, side-by-side channels. Two platforms are provided. Each includes a carriage configured to engage a respective one of the channels in each post and a hydraulic actuator and lifting cable system disposed within the platform for lifting the platform. An actuation system having a single hydraulic pump is provided with a valve for selectively supplying hydraulic power to either an upper- or a lower-platform hydraulic circuit. The simplified lift and actuation system configuration reduces manufacturing, shipping, installation, and materials costs and complexities.

20 Claims, 7 Drawing Sheets

(56) References Cited

U.S. PATENT DOCUMENTS

| | | | | |
|---|---|---|---|---|
| 5,178,288 | A | * | 1/1993 | Werner .................. B65G 1/026 211/151 |
| 5,180,069 | A | * | 1/1993 | Krummell .............. B65G 1/026 211/151 |
| 5,284,224 | A | * | 2/1994 | Carruth ..................... B66F 7/04 254/89 H |
| 5,622,466 | A | | 4/1997 | Rossato |
| 6,048,156 | A | * | 4/2000 | Huang ................... E04H 6/245 414/234 |
| 6,446,757 | B1 | | 9/2002 | Taylor |
| 7,597,521 | B2 | * | 10/2009 | Wastel ..................... B66F 7/02 414/254 |
| 8,075,237 | B2 | * | 12/2011 | Webster ................... E04H 6/18 414/331.14 |
| 9,266,674 | B2 | * | 2/2016 | Reimer .................. B65G 1/026 |
| 9,751,737 | B2 | | 9/2017 | Taylor et al. |
| 2004/0069181 | A1 | * | 4/2004 | Charbonneau ......... B65G 1/026 104/248 |
| 2004/0238285 | A1 | * | 12/2004 | Stokes ..................... B66F 7/02 187/208 |

FOREIGN PATENT DOCUMENTS

| | | |
|---|---|---|
| CN | 104343265 A | 2/2015 |
| CN | 105178654 A | 12/2015 |
| CN | 108756392 A | 11/2018 |
| DE | 19533887 A1 | 3/1997 |
| EP | 0499251 A2 | 8/1992 |
| EP | 0758706 A1 | 2/1997 |
| FR | 2545868 | 1/1983 |
| GB | 2549533 A | 10/2017 |
| JP | S5047173 A | 5/1975 |
| JP | H04143370 A | 5/1992 |
| JP | 2002147046 A | 5/2002 |
| WO | 9401642 | 1/1994 |
| WO | 2015118034 A1 | 8/2015 |
| WO | 2017182811 A1 | 10/2017 |

OTHER PUBLICATIONS

ParkPlus Brochure on Triple Stacker 3 Level Parking System, Copyright 2017.

* cited by examiner

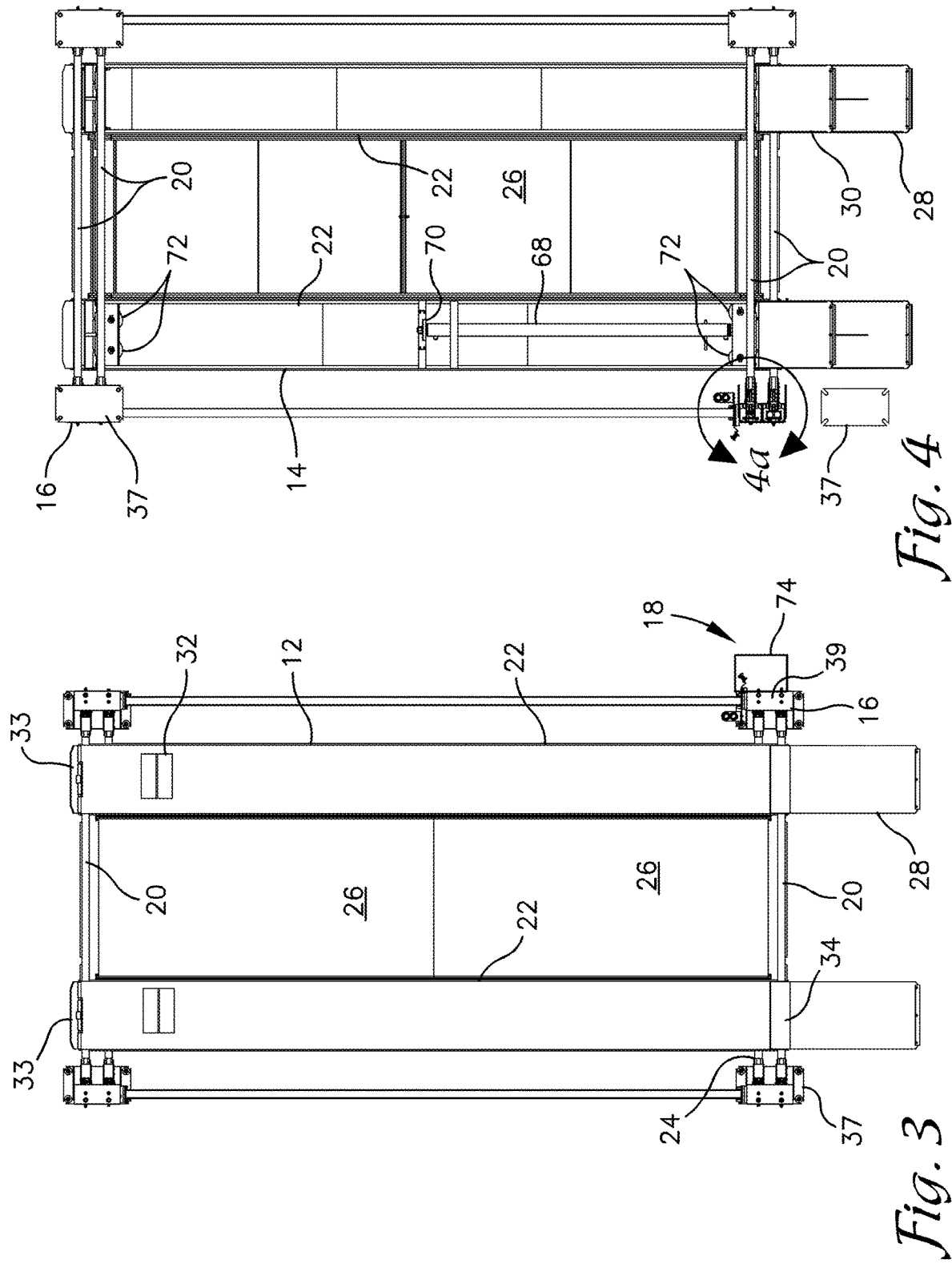

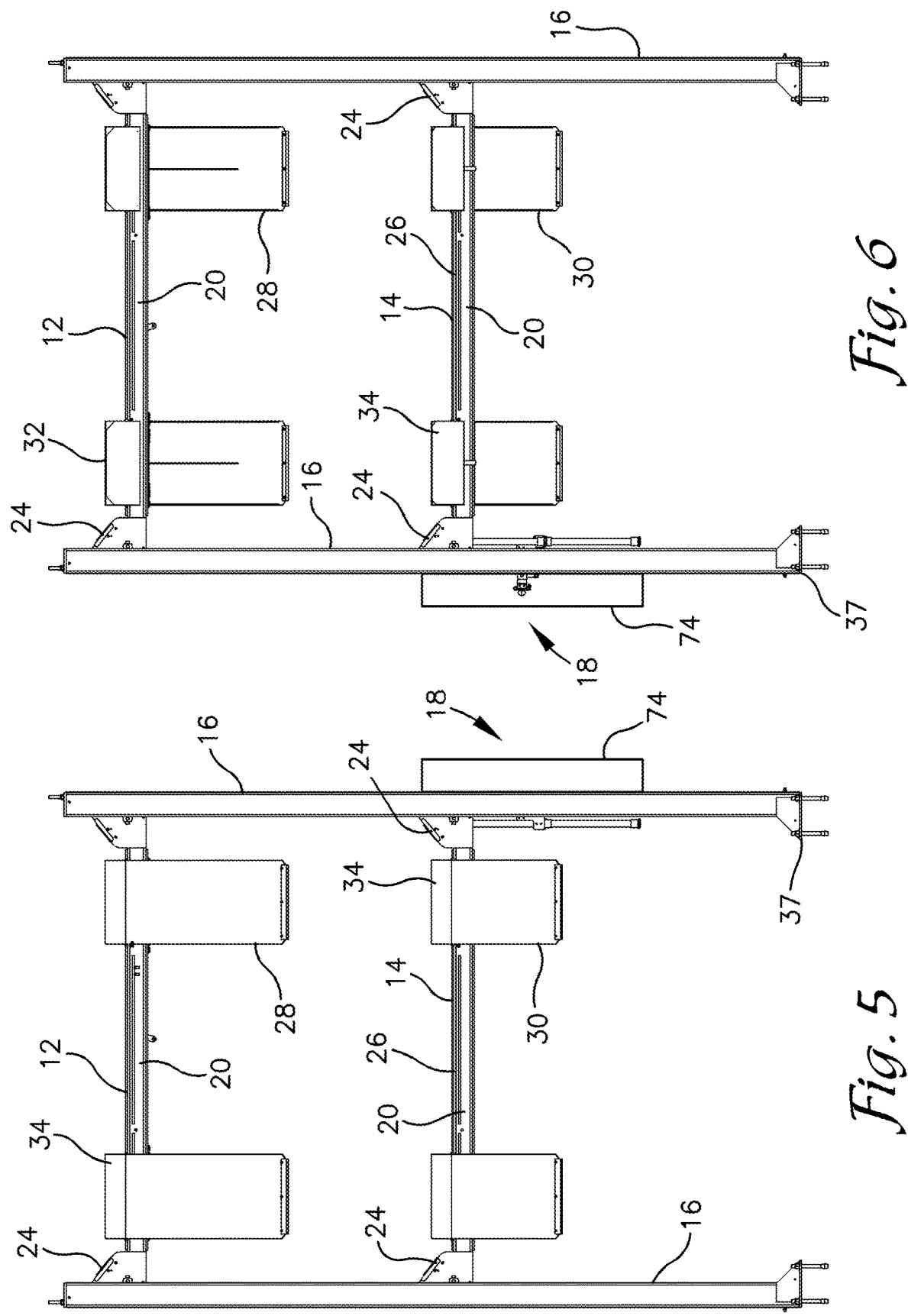

THREE-LEVEL VEHICLE LIFT

CROSS-REFERENCE TO RELATED APPLICATIONS

This application claims the benefit of U.S. Provisional Patent Application No. 62/795,353 filed Jan. 22, 2019 the disclosure of which is hereby incorporated herein in its entirety by reference.

BACKGROUND

Three-level vehicle and automobile lifts are widely available and known for use in service garages as well as for storage of automobiles. Available storage lifts enable one or multiple vehicles to be lifted vertically and positioned in a stacked arrangement such that subsequent vehicles can be stored beneath the lifted vehicles. Such known lifts and their associated components are complex, expensive, cumbersome, and difficult to ship and to install.

SUMMARY

Exemplary embodiments are defined by the claims below, not this summary. A high-level overview of various aspects thereof is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes a three-level vehicle lift with a simplified design that reduces materials, weight, complexity, and expense required for manufacturing, shipping, installation, and operation.

The lift includes four vertical support posts that are arranged at each corner of the assembly, an upper platform, a lower platform, and an actuation system. Each of the posts includes a pair of side-by-side tracks in which one track is dedicated to the upper platform and the other track to the lower platform. The upper and lower platforms are each provided with a carriage configured to engage a respective track in each leg and to travel vertically within the respective tracks as the platforms are moved vertically.

The actuation system preferably comprises a hydraulic system and is configured to move the upper and lower platforms independently. In one embodiment, the hydraulic system includes a single pump and dedicated upper-platform and lower-platform hydraulic circuits. A valve system is provided between the pump and the upper- and lower-platform hydraulic circuits. The valve system is selectively actuated to select the upper- or the lower-platform hydraulic circuit for operation. A variety of sensors and switches may be provided to prevent accidental movement and contact between the upper and lower platforms and vehicles located thereon.

DESCRIPTION OF THE DRAWINGS

Illustrative embodiments are described in detail below with reference to the attached drawing figures, and wherein:

FIG. 3 is a top plan view of the three-level vehicle lift of FIG. 1;

FIG. 4 is a bottom plan view of the three-level vehicle lift of FIG. 1 with one base plate removed from a leg of the lift assembly depicted in accordance with an exemplary embodiment;

FIG. 4a is an enlarged view of a leg of the lift assembly as indicated in FIG. 4 at 4a;

FIG. 5 is a front or entry-end elevational view of the three-level vehicle lift of FIG. 1;

FIG. 6 is a rear end elevational view of the three-level vehicle lift of FIG. 1;

DETAILED DESCRIPTION

Figure 1:
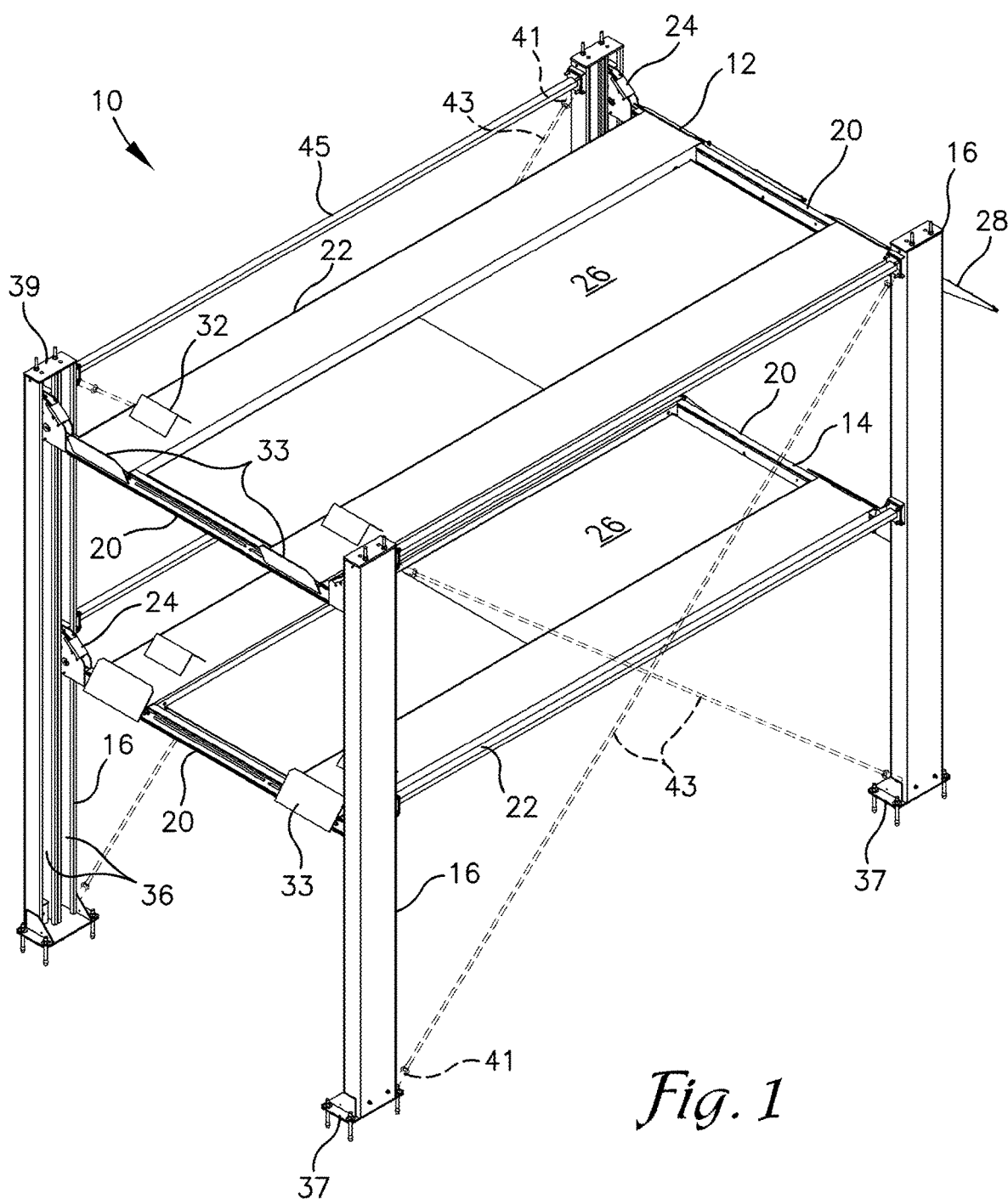
FIG. 1 is a perspective view of a three-level vehicle lift depicted in accordance with an exemplary embodiment.

The subject matter of select exemplary embodiments is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" or "substantially" as used herein denote deviations from the exact value by +/−10%, preferably by +/−5% and/or deviations in the form of changes that are insignificant to the function.

With reference to FIGS. 1-9, a three-level vehicle lift 10 is described in accordance with an exemplary embodiment. The lift 10 is described herein as a three-level vehicle lift, but such is not intended to limit the lift 10 to a particular number of levels. It is understood that the lift 10 can be configured to provide a greater number of levels without departing from the scope of embodiments described herein. The lift 10 is also described as a vehicle lift for use with automobiles like cars and light trucks, however the lift 10 can be used and/or configured for use with other vehicles, apparatus, and objects that may be disposed on the lift 10, such as motorcycles, farm equipment, or the like.

The lift 10 includes an upper platform 12, a lower platform 14, four legs 16, and an actuation system 18. The upper and lower platforms 12, 14 are configured with substantially the same construction which provides a generally rectangular, planar platform with a pair of transverse crossmembers 20 extending across a width of the platform and a pair of longitudinal support beams 22 extending along the length thereof. The transverse crossmembers 20 are disposed at opposite longitudinal ends of the respective platform 12, 14 and include a carriage 24 disposed at each end thereof. Each carriage 24 is configured to engage and travel vertically along a leg 16 as described below.

The longitudinal support beams 22 (also referred to as longitudinal support tracks 22) extend between the transverse crossmembers 20 and are spaced apart a distance to accommodate a transverse wheel spacing of a vehicle to be disposed on the respective platform 12, 14. One or more central plates 26 may be disposed between the support beams 22 to at least partially fill the space therebetween and provide a generally continuous surface to the respective platform 12, 14. The generally continuous surface of the respective platform 12, 14, increases safety for users of the lift 10 and prevents objects and/or fluids from falling from the overlying platforms 12, 14 onto a vehicle and/or person positioned therebelow. In another embodiment, the central plates 26 are configured to be load bearing or the support beams 22 are configured to provide a continuous surface to the platform 12, 14 or additional support beams are included to provide additional load-bearing area to the platform 12, 14 such that vehicles or objects of varied dimensions can be supported thereon, e.g. motorcycles, all-terrain vehicles, lawn equipment, or the like.

Figure 2:
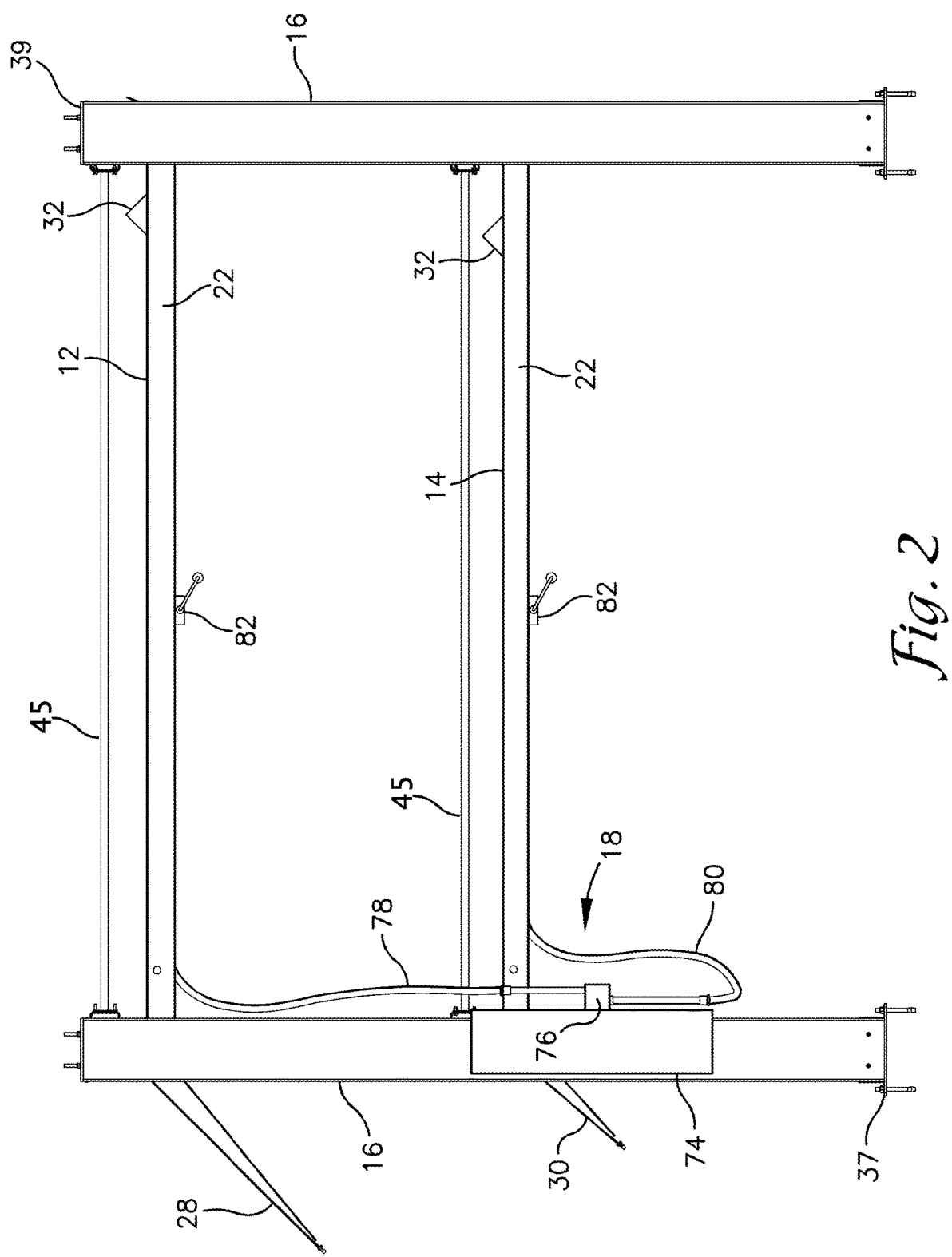
FIG. 2 is a side elevational view of the three-level vehicle lift of FIG. 1.

Upper- and lower-level entry ramps 28, 30 are hingedly coupled to front- or entry-ends of the support beams 22 and vehicle stops 32, 33 may be provided at or adjacent to opposite or rear ends of the support beams 22. As referred to herein, the front- or entry-end of the lift 10 is considered to be the end of the lift 10 through which vehicles are driven onto or off of the platforms 12, 14 and the end on which the ramps 28 and 30 are located (the left-hand side of the lift 10 as depicted in FIG. 2); the opposite end of the platforms 12, 14 is referred to as the rear end. The upper- and lower-level entry ramps 28, 30 are configured to ease travel of a vehicle onto the respective platform 12, 14 when the respective platform 12, 14 is in a fully lowered position. The ramps 28, 30 may have a length sufficient to provide a desired maximum entry angle or grade such that low-profile vehicles with low ground clearance can travel onto the platform 12, 14 without components of the vehicle other than the tires contacting the ramps 28, 30 and the platforms 12, 14. The upper-level entry ramp 28 may thus have a longer length than the lower-level entry ramp 30 because the fully lowered position of the upper platform 12 is higher than and on top of the lower platform 14.

The upper- and lower-level entry ramps 28, 30 may include a flange 34 that extends over the respective platform 12, 14 and beyond a hinged connection point between the ramp 28, 30 and the platform 12, 14. The hinged coupling of the entry ramps 28, 30 allows the ramps 28, 30 to pivot at least partially downward as the respective platform 12, 14 is raised. As such, downward pivoting of the entry ramp 28, 30 pivots the flange 34 upward and away from the respective platform 12, 14. In the upwardly pivoted position as best seen in FIGS. 5 and 6, the flange 34 forms a vehicle safety stop that obstructs rearward travel of the vehicle off of the entry-end of the platform 12, 14 when in a raised position.

The vehicle stops 32, 33 similarly function to obstruct forward travel of a vehicle off of the rear end of the platform 12, 14 and to aid properly positioning the vehicle longitudinally along the platform 12, 14. As depicted in FIG. 2, the vehicle stops 32 may comprise a raised member extending transversely across the support beams 22, but any raised feature or depression configured to engage or obstruct further forward travel of the vehicle along the support beams 22 may employed. In one embodiment, the vehicle stops 32 are adjustably positionable on the support beams 22 so that the stops 32 may be repositioned longitudinally along the support beams 22 to accommodate vehicles of varied wheelbase dimensions. In another embodiment, the stops 32 comprise simple wheel chocks that are placed on the support beams 22 after a vehicle has been parked thereon to resist rolling of the vehicle. As depicted in FIGS. 1 and 6, the stops may be configured as end stops 33 that comprise a vertically extending flange extending from rear ends of the support beams 22 which resist travel of the vehicle wheels off the rear end of the support beams 22.

The legs or leg assemblies 16 are spaced apart from each other and each have substantially the same configuration. As such only a single leg 16 is described in detail here. Each leg 16 includes a pair of parallel, vertically extending channels 36 that are aligned and abutted side-by-side. Each leg 16 is further provided with a base plate 37 and a cap plate 39 disposed at opposing ends thereof and may include support rod mounts 41 coupled to an outer surface, among other features for supporting and anchoring the lift 10 in position. In one embodiment, a support rod 43 or cable may be connected between the support rod mounts 41 on adjacent legs 16 on either side of the lift 10 so that the support rod 43 extends between the bottom of one leg 16 and the top of the longitudinally adjacent leg 16 as depicted in phantom lines in FIG. 1. As depicted in FIGS. 1 and 2, in another embodiment, one or more support rods or other support members 45 may extend horizontally between adjacent pairs of the legs 16, among other configurations to provide structural stability to the lift 10.

Figure 4A:
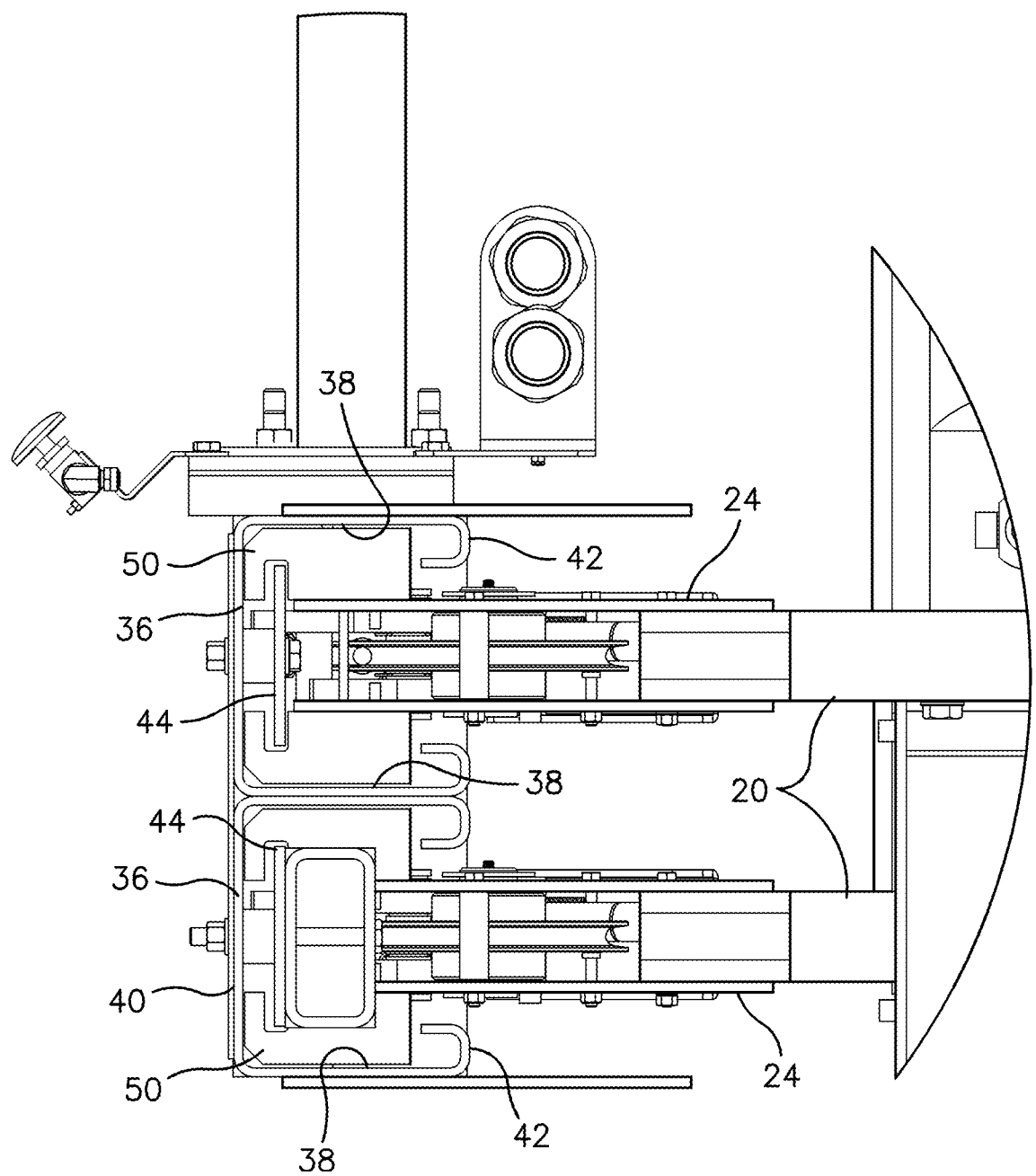
Figure 7:
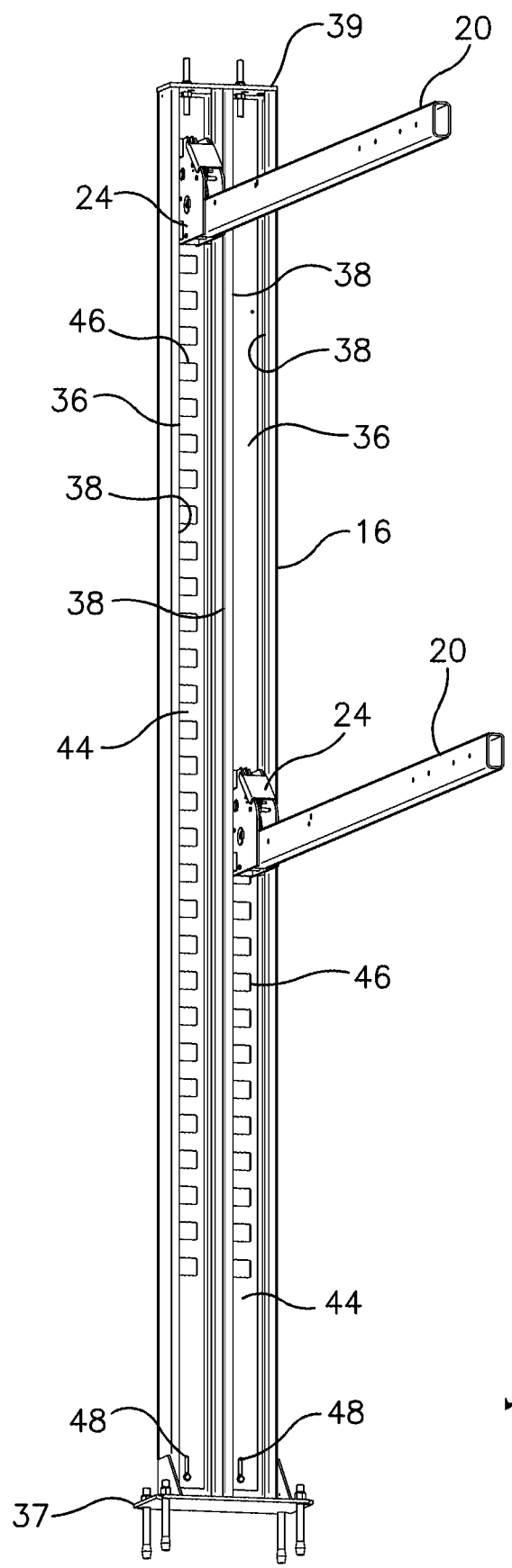
FIG. 7 is a perspective view of a leg of the three-level vehicle lift of FIG. 1 with two carriages installed in accordance with an exemplary embodiment.

As best seen in FIGS. 4, 4a, and 7, the channels 36 may be formed by joining two C-channel members side-by-side, such as by welding, or by installing a central rib within a larger C-channel member to provide a E-shaped configuration, among other configurations. The channels 36 each include a pair of side walls 38 with a back wall 40 extending between outer edges thereof. Inner edges of the side walls 38 curl inward toward one another a distance and then toward the back wall 40 to form short hooked flanges 42, however other configurations may be employed without departing from the scope described herein.

As shown in FIG. 7, a stop-plate 44 is installed in each channel 36 along and spaced apart from the back wall 40. The stop-plate 44 extends substantially the vertical length of the respective channel 36 and includes a plurality of locking apertures 46 aligned and spaced along at least a portion of the length of the stop-plate 44. The stop-plate 44 is preferably affixed in the channel 36 spaced apart from the back wall 40 and in a manner that enables at least partial adjustment of the vertical position thereof. For example, as depicted in FIG. 7, the stop-plate 44 includes a slotted aperture 48 through which a fastener may be installed, but the stop-plate 44 may be joined or coupled to the channel 36 in any manner. In one embodiment, the stop-plate 44 may be omitted and the locking apertures 46 formed in the back wall 40 of the channel 36.

Figure 8:
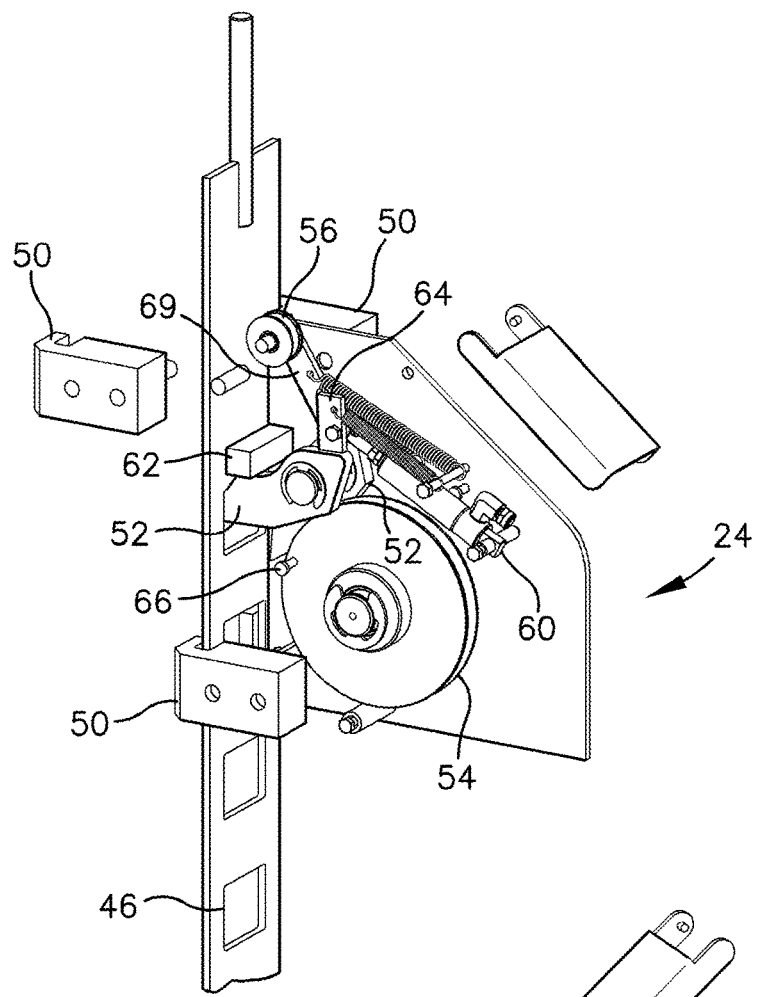
FIG. 8 is a partially exploded, perspective first side view of a carriage with a side plate removed to reveal internal components thereof depicted in accordance with an exemplary embodiment.
Figure 9:
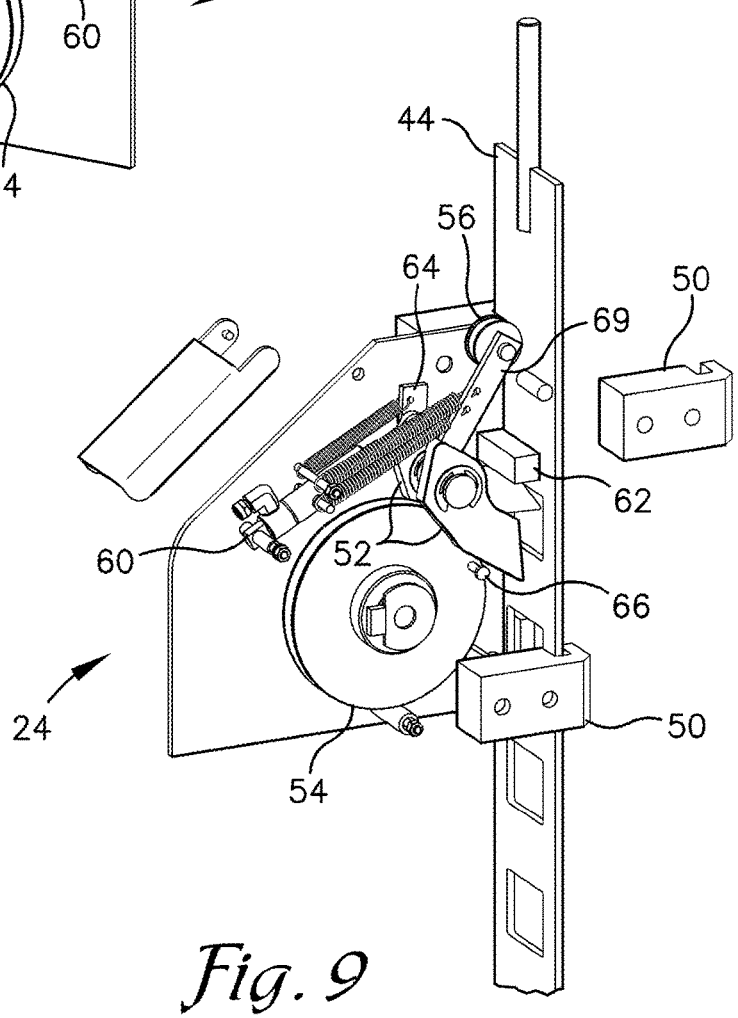
FIG. 9 is a partially exploded, perspective second side view of the carriage of FIG. 8 with an opposite side plate removed to reveal internal components thereof depicted in accordance with an exemplary embodiment.

The channels 36 are configured to receive the carriages 24 disposed at ends of the transverse crossmembers 20 as depicted in FIGS. 7-9. The carriages 24 are configured to travel vertically within the channels 36 as the respective platforms 12, 14 are moved vertically. The carriages 24 are configured to accommodate the actuation system 18 which employs a number of cables to move the platforms 12, 14 as described more fully below, however the carriages 24 may be configured to accommodate other actuation systems 18.

As depicted in FIG. 1, the carriages 24 of the upper platform 12 all engage the outermost channels 36 on each of the legs 16 (i.e. the forwardmost channels 36 of the legs 16 on the entry end of the lift 10 and the rearwardmost channels 36 of the legs 16 on the rear end of the lift 10) while the carriages 24 of the lower platform 14 all engage the inner channels 36 of each leg 16, however other configurations may be employed. For example, in another embodiment the carriages 24 of the upper platform 12 all engage the forwardmost channels 36 of the legs 16 while the carriages 24 of the lower platform 14 all engage the rearwardmost channels 36 of the legs. Such a configuration may be beneficial because it enables the upper and lower platforms 12, 14 to be identically and interchangeably constructed thus reducing a number of different parts or components needed for the lift 10.

The carriages 24 include guides 50 that are entrapped between the hooked flanges 42 and the back wall 40 of the channel 36 and that slideably engage the stop-plate 44 to guide travel of the carriages vertically along the stop-plate 44 within the channels 36. The carriages 24 also include latching members 52, a travel pulley 54, a guide pulley 56, and a locking actuator 60.

The latching members 52 are biased to pivot toward the stop-plate 44 and to engage the locking apertures 46. A pair of latching members 52 is provided and each member of the pair is configured to alternate between engaged and disengaged alignment with the locking apertures 46 such that one latching member 52 of the pair is always engaged with a locking aperture 46. A catch block 62 extends across and above the latching members 52 to define an upper limit to the pivoting of the latching members 52. As such, unintended downward movement of the carriage 24 and thus the associated platform 12, 14, such as upon a failure within the lift 10 components, is restricted or arrested by inter-engagement of the latching member 52 with the locking aperture 46 and the catch block 62.

The locking actuator 60 includes a biased pivoting member 64 at a distal end of a piston of the actuator 60. When actuated, the member 64 engages a surface of one of the latching members 52 to resist pivoting of the latching member 52 away from engagement with the locking apertures 46 and thus locks the carriage 24 and the associated platform 12, 14 in a vertical position. The locking actuator 60 is preferably a pneumatic actuator but may employ any actuation means.

The travel pulley 54 receives a cable (not shown) of the actuation system 18 from a transverse direction along the platform 12, 14 and redirects the cable vertically upward toward the cap plate 39 disposed on a top end of the respective leg 16 and providing an attachment point for the cable. The travel pulley 54 includes a pair of pins 66 extending from opposing axial surfaces thereof and configured to engage the latching members 52 in a cam-like fashion during downward travel of the platform 12, 14. Such camming action pivots the latching members 52 away from the locking apertures 46 and thus allows downward travel of the carriage 24.

The guide pulley 56 is provided on a distal end of a biased, pivoting arm 69. The pivoting arm 69 extends from an upper edge of one of the latching members 52 is pivotable with the latching member 52. The guide pulley 56 engages and is biased against the cable (not shown) and may guide the cable toward the cap plate 39. The bias on the guide pulley 56 operates to pivot the associated latching member 52 toward engagement with the locking apertures 46 upon breakage or the occurrence of slack in the cable and thus operates as a safety catch mechanism.

With reference now to FIG. 2, the actuation system 18 includes a hydraulic system that is operated to manipulate a series of cables (not shown) that work to raise and lower the platforms 12, 14. Although a hydraulic system is described herein other systems, such as pneumatic or electronic systems may be employed. The actuation system 18 includes a hydraulic actuator 68 disposed on an underside of one of the longitudinal support beams 22 of each of the platforms 12, 14, as shown in FIG. 4. The piston of the actuator 68 is coupled to a carrier 70 that couples to four lifting cables (not shown). Cable pulleys 72 are provided on the carrier 70 and near each end of the support beam 22 to direct the lifting cables from the carrier 70 to respective legs 16 (the cable pulleys 72 on the carrier 70 are obstructed from view and are not shown). The lifting cables are threaded through the respective carriages 24 and distal ends thereof are coupled to the respective cap plates 39 on the associated legs 16. As such, actuation of the actuator 68 draws the lifting cables in to raise the respective platform 12, 14 or feeds the lifting cables out to lower the platform 12, 14 or vice versa. In one embodiment, the hydraulic actuator 68 and lifting cable configuration may be similar to that of an HD-9 four-post lift from BendPak, Inc. of Santa Paula, Calif. In some embodiments, removeable covers or plates may be provided on a bottom surface of the support beams 22 to enclose the hydraulic actuator 68 therein to increase safety and/or aesthetics of the lift 10 and to prevent fluids escaping from the hydraulic system from dripping onto objects below.

Referring to FIGS. 2 and 3, the actuation system 18 includes a single hydraulic pump 74, the output of which is coupled to a regulator or valve 76 which is further connected to an upper-platform hydraulic circuit 78 and a lower-platform hydraulic circuit 80, and as depicted in FIG. 2. The valve 76 is operable to selectively regulate hydraulic fluid flow or power to either the upper circuit 78 or the lower circuit 80. The valve 76 may comprise a manually operable ball-valve or similar valve means or may comprise an electronically controlled solenoid valve, among other configurations.

The actuation system 18 may also include a pneumatic pump (not shown), valve, and upper- and lower-platform pneumatic circuits configured to provide pneumatic power or pressurized air to the locking actuators 60 for operation thereof in a manner similar to that of the hydraulic circuits 78, 80

The actuation system 18 may further comprise a number of sensors, switches, or the like, such as proximity sensors, limit switches, infrared detectors, cameras, light curtains, or the like configured to detect characteristics like the presence of objects on the platforms 12, 14 and beneath the lower platform 14, the location or height of such objects, and the vertical position of the platforms 12, 14 relative to one another, among other characteristics. The sensors can be disposed on the legs 16, surfaces of the platforms 12, 14, or other surfaces of the lift 10 or surrounding environment. For example, as depicted in FIG. 2, a sensor 82 is coupled to the underside of one or both platforms 12, 14. The sensor 82 includes a pivoting lever or bar that hangs downward from an underside of the respective platform 12, 14 and is configured to pivot upward when coming into contact with a vehicle or other object parked beneath the respective platform 12, 14 and/or when contacting the underlying platform 14 or the ground. Upward pivoting of the lever causes the sensor 82 to provide a signal which can be employed to cease operation and/or movement of the respective platform 12, 14 to avoid collisions between the platforms 12, 14 and the vehicles or objects parked thereon. The sensor 82 may be positioned and/or adjustably positionable to align with a roof or high point of the underlying vehicle and the lever may be padded or otherwise coated to avoid damaging the underlying vehicle when coming into contact therewith. Although only a single sensor 82 is shown coupled to the platform 12, any number of sensors 82 and other sensors of the same or different configuration may be employed. A control system may be provided for control and operation of the actuation system 18 in accordance with inputs provided by the sensors and with proper sequencing of the locking actuators 60 and the hydraulic actuators 68.

With continued reference to FIGS. 1-9, operation of the three-level vehicle lift 10 is described in accordance with an exemplary embodiment. With the upper and lower platforms 12, 14 in their lowered positions, a first vehicle is driven up the upper-level entry ramps 28 onto the support beams 22 of the upper platform 12. The vehicle may be driven along the support beams 22 until contact is made between the tires thereof and the vehicle stops 32 (or end stops 33). The vehicle is then shut down and placed in a secured, parked configuration, e.g. placed in park and an emergency brake applied.

The actuation system 18 is energized and the valve 76 actuated to direct hydraulic fluid to the upper-platform hydraulic circuit 78. Pneumatic power may also be provided to the locking actuators 60 in each carriage 24 of the upper platform 12 to enable pivoting of the associated latching members 52. Actuation of the hydraulic actuator 68 in the upper platform 12 draws in the lifting cables which in turn raises the upper platform 12. As the upper platform 12 moves upward, the respective carriages 24 travel vertically along their respective channels 36 and the latching members 52 alternately engage the locking apertures 46. Upon reaching a desired height, actuation of the actuator 68 is halted and the locking actuators 60 are activated to lock the upper platform 12 in position. In some embodiments, the upper platform 12 may be allowed to lower slightly to ensure full engagement of the latching members 52 with the appropriate locking apertures 46. Such may be accomplished by allowing bleed back in the hydraulic circuit 78. The desired height of the first platform 12 is preferably at the maximum extent of available travel of the upper platform 12 but lower positions may be employed.

A second vehicle can next be disposed on the lower platform 14 and raised in a manner similar to that of the first vehicle and the upper platform 12 as described above. However, the valve 76 must first be actuated to open the pump 74 output to the lower-platform hydraulic circuit 80. A valve associated with the pneumatic system may also be actuated. A control system for the lift 10 and associated with the actuation system 18 may detect a number of signals from sensors on the lift 10 prior to and during lifting of the upper and lower platforms 12, 14 to ensure safe operation and to avoid contact between the platforms 12, 14 and vehicles or objects disposed thereon.

Following lifting of the lower platform 14 to a desired height and securing the platform 14 in place via the latching members 52 and the locking actuator 60, a third vehicle may be disposed beneath the lower platform 14.

The three-level vehicle lift 10 provides many benefits over lifts available in the art. The simplicity, reduced complexity, and reduced number of components reduces the costs and materials required for manufacture thereof. Costs for shipping and installation of the lift 10 are thus also reduced. Additionally, the above described configuration has increased operating capacity over known designs and offers increased functionality and ease of use over known designs. The lift 10 can also be easily expanded to larger applications without a great deal of redesign. For example, a fourth or subsequent levels might be simply added by incorporating an additional channel 36 to each leg for each additional level, adding additional platforms that travel within the additional channels 36, and adding an additional hydraulic circuits to the actuation system 18. Prior designs are not so easily altered or expanded.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A multi-level vehicle lift comprising:
   a plurality of vehicle platforms positioned in a vertically stacked arrangement to overlie one another, each vehicle platform configured to receive and support a vehicle thereon and vertically movable independently from each other;
   a plurality of leg assemblies spaced apart from each other and wherein each of the plurality of leg assemblies includes a number of vertically extending channels arranged side-by-side together, the number of channels in each leg assembly being equal to a total number of vehicle platforms in the plurality of vehicle platforms, each channel of each leg assembly being associated with a respective one of the plurality of vehicle platforms; and
   a plurality of carriages, each carriage engaging a respective one of the channels and coupled to and extending laterally from a respective vehicle platform associated with the respective one of the channels, the carriages being configured to move vertically along the respective channel to enable movement of the respective platform vertically.

2. The multi-level vehicle lift of claim 1, wherein the plurality of vehicle platforms comprises two vehicle platforms and the number of channels in each leg assembly comprises two channels, and wherein the carriages associated with a first of the vehicle platforms are disposed in a first channel in each of the leg assemblies and the carriages associated with a second of the vehicle platforms are disposed in a second channel in each of the leg assemblies.

3. The multi-level vehicle lift of claim 2, wherein the plurality of leg assemblies comprises four leg assemblies.

4. The multi-level vehicle lift of claim 2, wherein the first of the vehicle platforms is configured to support a first vehicle thereon, the second of the vehicle platforms is configured to support a second vehicle thereon, the first of the vehicle platforms is positioned vertically above and overlying the second of the vehicle platforms, and the second of the vehicle platforms is configured to be positioned above a third vehicle.

5. The multi-level vehicle lift of claim 1, further comprising:
   a power system configured to power movement of each of the vehicle platforms vertically along the leg assemblies;

a plurality of circuits, each circuit being associated with a respective one of the plurality of vehicle platforms and in communication with the power system; and a regulator in the power system and in communication with each of the plurality of circuits, the regulator being actuated to selectively supply power to each of the plurality of circuits.

6. The multi-level vehicle lift of claim 5, wherein the power system comprises a hydraulic system, the plurality of circuits comprise hydraulic circuits, and the regulator comprises a valve.

7. The multi-level vehicle lift of claim 1, further comprising:

a sensor disposed on an underside surface of one or more of the vehicle platforms, the sensor configured to detect presence of an object in close proximity to the underside surface.

8. A multi-level vehicle lift comprising:

a plurality of vehicle platforms positioned in a vertically stacked arrangement to overlie one another, each vehicle platform configured to receive and support a vehicle thereon;

a plurality of leg assemblies that each includes a number of vertically extending channels arranged side-by-side together, each of the channels being C-shaped to provide a pair of side walls and a back wall, and distal edges of the side walls including flanges extending at least partially toward one another, the number of channels in each leg assembly being equal to a total number of vehicle platforms in the plurality of vehicle platforms, each channel of each leg assembly being associated with a respective one of the plurality of vehicle platforms; and a plurality of carriages, each carriage engaging a respective one of the channels and coupled to the respective vehicle platform associated with the respective one of the channels, the carriages being configured to move vertically along the respective channel to enable movement of the respective platform vertically.

9. The multi-level vehicle lift of claim 8, wherein the side walls of adjacent ones of the channels abut.

10. The multi-level vehicle lift of claim 8, wherein the channels of each leg assembly are arranged side-by-side with the back walls thereof aligned in a plane that extends parallel to a longitudinal dimension of the lift and parallel to a direction of travel of a vehicle onto the lift.

11. A multi-level vehicle lift comprising:

an upper-vehicle platform configured to receive and support a vehicle thereon;

a lower-vehicle platform positioned vertically beneath the upper-vehicle platform and configured to receive and support another vehicle thereon;

a plurality of leg assemblies spaced apart from each other and wherein each of the plurality of leg assemblies includes a first and a second vertically extending channel, the first and second channels of each leg assembly having a C-shaped cross-sectional shape that provides a pair of side walls and a back wall and being arranged side-by-side with adjacent side walls thereof abutting, the first channel of each leg assembly being associated with the upper-vehicle platform and the second channel of each leg assembly being associated with the lower-vehicle platform; and a plurality of carriages, each carriage engaging a respective one of the first or second channels and coupled to and extending laterally from the respective upper- or lower-vehicle platform associated with the respective one of the first or second channels, the carriages being configured to move vertically along the respective first or second channel to enable movement of the respective upper-vehicle platform or lower-vehicle platform vertically, wherein the upper-vehicle platform and the lower-vehicle platform are vertically movable independently from each other.

12. The multi-level vehicle lift of claim 11, further comprising:

a power system configured to power movement of each of the upper- and lower-vehicle platforms vertically along the leg assemblies; an upper-platform circuit being associated with the upper-vehicle platform and in communication with the power system;

a lower-platform circuit associated with the lower-vehicle platform and in communication with the power system; and a regulator in the power system and in communication with each of the upper- and lower-platform circuits, the regulator being actuated to selectively supply power to each of the upper- and lower- platform circuits.

13. The multi-level vehicle lift of claim 12, wherein the power system comprises a hydraulic system, the upper- and lower-platform circuits comprise hydraulic circuits, and the regulator comprises a valve.

14. The multi-level vehicle lift of claim 11, further comprising:

a sensor disposed on an underside surface of one or both of the upper-vehicle platform and the lower-vehicle platform, the sensor configured to detect presence of an object in close proximity to the underside surface.

15. A multi-level vehicle lift comprising:

a plurality of vehicle platforms in a vertically stacked arrangement, wherein each of the plurality of vehicle platforms is vertically movable independently from each other;

four leg assemblies spaced apart from each other, each leg assembly including a number of vertically extending channels, each channel having a C-shaped cross-sectional shape that provides a pair of side walls and a back wall with side walls of adjacent channels in the leg assembly abutting, each channel of each leg assembly including a carriage disposed at least partially therein and configured to travel vertically along the channel, each carriage of each leg assembly being associated with a respective vehicle platform that is configured to receive and support a vehicle, the number of channels in each leg assembly corresponding with a number of the vehicle platforms included in the multi-level vehicle lift.

16. The multi-level vehicle lift of claim 15, wherein the number of channels in each leg assembly is two channels.

17. The multi-level vehicle lift of claim 15, wherein the back walls of each of the channels in a respective leg assembly are aligned in a plane that extends parallel to a direction of travel of the vehicle onto the vehicle platform.

18. The multi-level vehicle lift of claim 15, further comprising:

a cap plate disposed at a top end of each leg assembly and extending across top ends of each channel of the leg assembly, the cap plate providing an attachment location for a cable employed for movement of the vehicle platform vertically along the leg assembly.

19. A multi-level vehicle lift comprising:
a plurality of vehicle platforms in a vertically stacked arrangement, wherein each of the plurality of vehicle platforms is vertically movable independently from each other;
a plurality of leg assemblies that each includes a number of vertically extending channels, each channel having a C-shaped cross-sectional shape that provides a pair of side walls and a back wall with side walls of adjacent channels in the leg assembly abutting, distal edges of the side walls of each channel each including a flange extending at least partially toward the flange of the opposite side wall, each channel of each leg assembly including a carriage disposed at least partially therein and configured to travel vertically along the channel, each carriage of each leg assembly being associated with a respective one of the plurality of vehicle platforms that is configured to receive and support a vehicle, and the number of channels in each leg assembly corresponding with a number of the vehicle platforms included in the multi-level vehicle lift.

20. The multi-level vehicle lift of claim 19, further comprising:
a stop plate disposed in each channel and extending vertically along and spaced apart from the back wall of the channel, the stop plate including a plurality of vertically spaced locking apertures configured to receive a latching member of a respective carriage disposed in the channel, and each carriage including a guide that is entrapped between the back wall and one or both of the flanges of the side walls and slidably engages the stop plate.

* * * * *